(12) United States Patent
Tang

(10) Patent No.: US 10,065,121 B2
(45) Date of Patent: Sep. 4, 2018

(54) METHOD AND APPARATUS FOR RECORDING DATA OF NETWORK INTERACTION PROTOCOL

(71) Applicant: TENCENT TECHNOLOGY (SHENZHEN) COMPANY LIMITED, Shenzhen (CN)

(72) Inventor: Shengfu Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 894 days.

(21) Appl. No.: 14/451,368

(22) Filed: Aug. 4, 2014

(65) Prior Publication Data

US 2015/0119150 A1  Apr. 30, 2015

Related U.S. Application Data

(63) Continuation of application No. PCT/CN2014/078734, filed on May 29, 2014.

(30) Foreign Application Priority Data

Oct. 30, 2013 (CN) .......................... 2013 1 0529375

(51) Int. Cl.
*H04N 9/80* (2006.01)
*A63F 13/85* (2014.01)
*A63F 13/355* (2014.01)

(52) U.S. Cl.
CPC ............ *A63F 13/85* (2014.09); *A63F 13/355* (2014.09)

(58) Field of Classification Search
USPC .................................................. 386/239–248
See application file for complete search history.

(56) References Cited

U.S. PATENT DOCUMENTS

| | | | |
|---|---|---|---|
| 2009/0066845 A1 | 3/2009 | Okuda | |
| 2010/0162273 A1* | 6/2010 | Shoji | G06F 11/3466 719/323 |
| 2013/0084969 A1 | 4/2013 | Knoles et al. | |
| 2013/0132833 A1* | 5/2013 | White | G06F 3/048 715/704 |

(Continued)

FOREIGN PATENT DOCUMENTS

| | | |
|---|---|---|
| CN | 1805362 A | 7/2006 |
| CN | 101500148 A | 8/2009 |

(Continued)

OTHER PUBLICATIONS

Taiwan Intellectual Property Office (TIPO) Office Action 1 for 103136183 dated Sep. 1, 2015 pp. 1-6.

(Continued)

*Primary Examiner* — Hung Dang
(74) *Attorney, Agent, or Firm* — Anova Law Group, PLLC

(57) ABSTRACT

Methods and apparatus for recording data of a network interaction protocol are provided. In an exemplary method, protocol data sent from a server are received and then recorded, when the protocol data are recordable protocol data. The recorded protocol data are encoded into a video file. The video file is sent to the server and stored on the server. A video player can be used to play the video file. The apparatus can include a receiving and sending module, a recording module, and/or an encoding module.

14 Claims, 5 Drawing Sheets

(56) References Cited

U.S. PATENT DOCUMENTS

| | | | |
|---|---|---|---|
| 2013/0244785 A1 | 9/2013 | Gary | |
| 2014/0045591 A1* | 2/2014 | Chen | A63F 13/10 463/31 |
| 2014/0179424 A1* | 6/2014 | Perry | A63F 13/355 3/355 |
| 2014/0292783 A1* | 10/2014 | Iwagaki | G06T 1/00 345/522 |
| 2015/0265921 A1* | 9/2015 | Curtis | A63F 13/63 463/31 |

FOREIGN PATENT DOCUMENTS

| | | |
|---|---|---|
| CN | 102054510 A | 5/2011 |
| CN | 102799432 A | 11/2012 |

OTHER PUBLICATIONS

The World Intellectual Property Organization (WIPO) International Search Report for PCT/CN2014/078734 dated Aug. 29, 2014 pp. 1-4.
The State Intellectual Property Office of the People's Republic of China (SIPO) Office Action 1 for 201310529375.2 dated Nov. 3, 2017 7 Pages (including translation).

* cited by examiner

METHOD AND APPARATUS FOR RECORDING DATA OF NETWORK INTERACTION PROTOCOL

CROSS-REFERENCES TO RELATED APPLICATIONS

This application is a continuation application of PCT Patent Application No. PCT/CN2014/078734, filed on May 29, 2014, which claims priority to Chinese Patent Application No. 2013105293752, filed on Oct. 30, 2013, the entire contents of which are incorporated herein by reference.

FIELD OF THE DISCLOSURE

The present disclosure relates to the field of data-processing technology and, more particularly, relates to methods, apparatus, and systems for recording data of a network interaction protocol.

BACKGROUND

When interacting via a network, for example, in an online-game, users may sometimes want to record certain operations or animations of a great fight or a game process by video-recording. The video-recording may often be performed using video-recording software to capture screen images and to generate a video file according to certain format of video coding. A video player may then be used to play the video files. The recorded video files may be played back in network interaction processes.

However, video files obtained by conventional video-recording methods have a large data volume. For a 10-minute game video, the data volume may reach more than 100M bytes. It is difficult to transfer these large video files. Meanwhile, the video coding algorithm requires a large amount of computation. As such, during a video-recording process, such large computation may affect performances and effects of the game itself.

BRIEF SUMMARY OF THE DISCLOSURE

One aspect or embodiment of the present disclosure includes a method for recording data of a network interaction protocol. Protocol data sent from a server are received and recorded, when the protocol data are recordable protocol data. The recorded protocol data are encoded into a video file. The video file is sent to the server for storing. Optionally, after the video file is sent to the server for storing, the video file can be sent from the server and received for decoding into the protocol data. The protocol data after decoding can be played.

Another aspect or embodiment of the present disclosure includes an apparatus for recording data of a network interaction protocol. The apparatus includes a receiving and sending module, a recording module, and an encoding module. The receiving and sending module is configured to receive protocol data sent from a server. The recording module is configured to record the protocol data, when the protocol data are recordable protocol data. The encoding module, configured to encode the recorded protocol data into a video file, and the receiving and sending module is further configured to send the video file to the server for storing. The apparatus further includes a decoding module and a playing module. The receiving and sending module is further configured to receive the video file sent from the server. The decoding module is configured to decode the video file into the protocol data. The playing module is configured to play the protocol data after decoding.

Another aspect or embodiment of the present disclosure includes a method for recording data of a network interaction protocol. Protocol data sent from a game video storage server are received and determined that the protocol data are marked as recordable protocol data. The recordable protocol data include fighting protocol data, which are sent to a protocol recording module for recording. After recording, the fighting protocol data together with a parameter of the fighting protocol data are encoded to generate a video file having an AMF format. The video file is then sent and stored to a storing module for the storing module to upload to the game video storage server for downloading and sharing by a video player.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-8 depict exemplary methods and apparatus for recording data of a network interaction protocol in accordance with various disclosed embodiments. The exemplary methods and apparatus can be implemented, for example, in an exemplary environment 900 as shown in FIG. 9.

Figure 9:
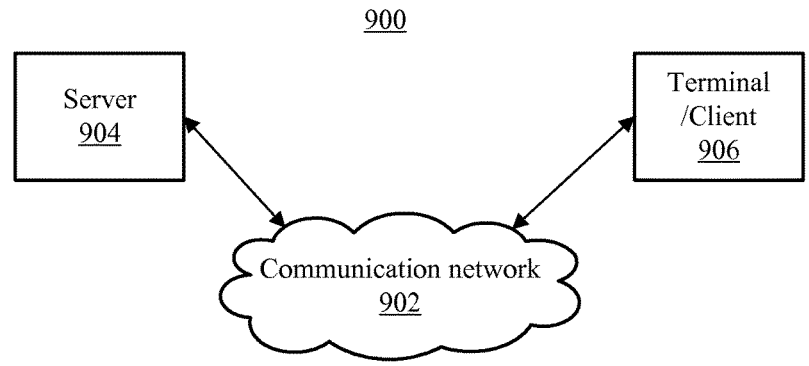
FIG. 9 depicts an exemplary environment incorporating certain disclosed embodiments.

FIG. 9 illustrates an exemplary environment 900 incorporating certain disclosed embodiments of the present invention. As shown in FIG. 9, environment 900 may include a server 904, a client 906, and a communication network 902. The server 904 and the client 906 may be coupled through the communication network 902 for information exchange, such as Internet searching. Although only one client 906 and one server 904 is shown in the environment 900, any number of clients 906 or servers 904 may be included, and other devices may also be included.

Communication network 902 may include any appropriate type of communication network for providing network connections to the server 904 and client 906 or among multiple servers 904 or clients 906. For example, communication network 902 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device. In various embodiments, the client can also include a client device.

A server, as used herein, may refer one or more server computers configured to provide certain server functionalities, such as database management and search engines. A server may also include one or more processors to execute computer programs in parallel. The server can include any server mentioned in the present disclosure, e.g., a storage server for an online game.

Figure 10:
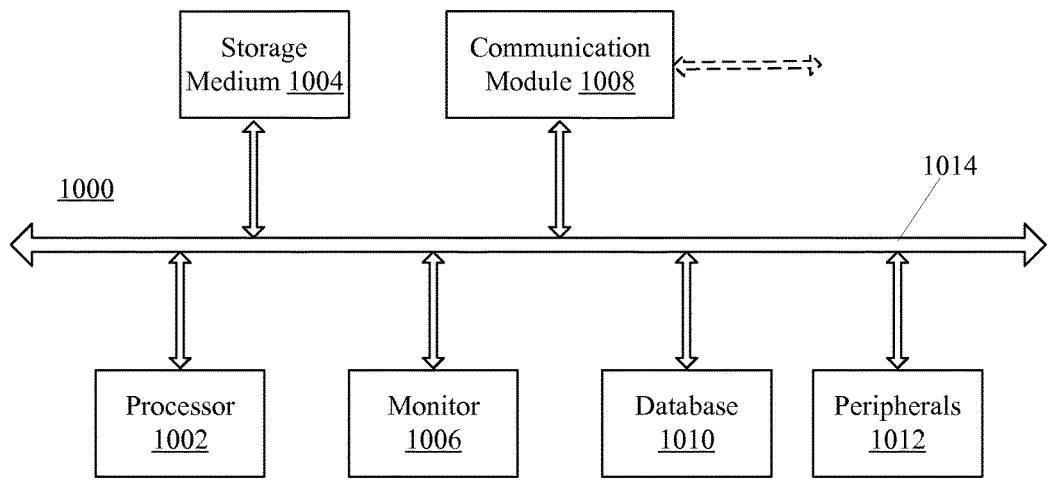
FIG. 10 depicts an exemplary computer system consistent with the disclosed embodiments.

The server 904 and/or the client 906 can include a computer system 1000 as shown in FIG. 10. The computer system 1000 may include a processor 1002, a storage medium 1004, a monitor 1006, a communication module 1008, a database 1010, peripherals 1012, and one or more bus 1014 to couple the devices together. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, and flash memory modules, and mass storages, such as CD-ROM, U-disk, removable hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network 902. Database 1010 may include one or more databases for storing certain data and for performing certain operations on the stored data, such as webpage browsing, database searching.

In operation, client 906 may cause server 904 to perform certain actions, such as an Internet search or other database operations. Server 904 may be configured to provide structures and functions for such actions and operations. More particularly, server 904 may include a data searching system for real-time database searching. The real-time database searching functionality may be realized by separating a server database into a plurality of databases each having a fixed upper limit on the database capacity, i.e., maximum capacity. Thus, instead of creating indices for a single large database, which may be a large number, indices of the plurality of smaller databases can be created with substantially less amount of time.

Figure 1:
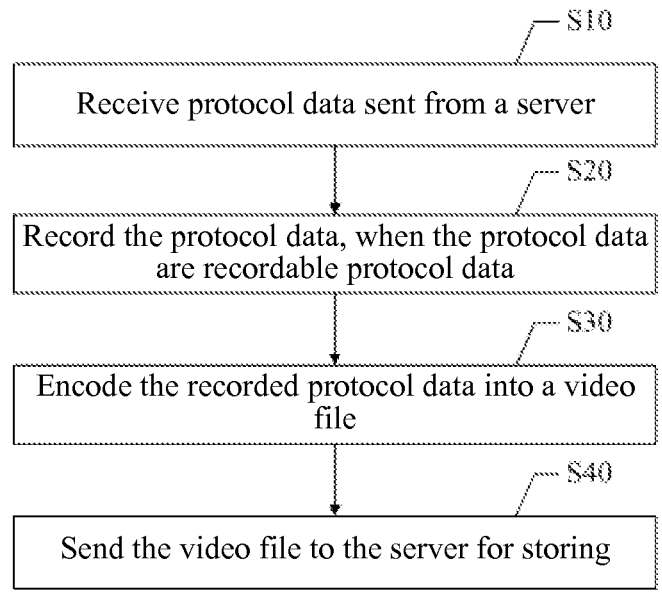
FIG. 1 depicts an exemplary method for recording data of a network interaction protocol consistent with various disclosed embodiments.

FIG. 1 depicts an exemplary method for recording data of a network interaction protocol consistent with various disclosed embodiments. In Step S10, protocol data sent from a server are received.

In various embodiments, the network interaction can include, e.g., online games, forums, and/or dating websites. In an example of online games, when a user accesses an online game via a browser, the network layer of main program of the game may receive protocol data sent from a game server (e.g., a game video storage server). The protocol data includes recordable protocol and the non-recordable protocol. The recordable protocol includes a protocol marked as recordable when being developed. The recordable protocol can include, e.g., a fighting protocol. The non-recordable protocol includes recordable protocols that are not marked as recordable, when being developed. The non-recordable protocol can include, e.g., an interaction protocol.

In Step S20, the protocol data are recorded, when the protocol data are recordable protocol data. When receiving the protocol data, the main program of the game (or game main program) determines whether the protocol data are marked as recordable protocol. When sending the protocol data to the fighting logic of the game main program, the main program further simultaneously records the recordable protocol data.

In Step S30, the recorded protocol data are encoded into a video file. For the recorded protocol data code, as the data volume (or size) of the protocol data is small, the data volume of the video file obtained after encoding is also small. The occupied network transmitting source and the storage space can thus be less, which improves transmitting efficiency for uploading, sharing, etc. Additionally, the encoding process does not cause any burden to the process of the game itself.

In Step S40, the video file is sent to the server for storing. The video file is uploaded to the storage medium of the game server, or uploaded to the storage server for the game videos, the video files can be directly downloaded from the game server or the storage server when playbacks are needed for sharing or uploading of various users.

As such, the video files are obtained from encoding protocol data. As the data volume of the protocol data is small, the data volume of the video files after encoding is also small. The occupied network transmitting source and the storage space can thus be less, which improves transmitting efficiency for uploading, sharing, etc. Additionally, the encoding process does not cause any burden to the process of the game itself. Further, due to the pre-marking of the recordable protocol data, when the user accesses the game, the main program can record the recordable protocol data automatically without manually starting the recording function by the user. Reliability for recording the protocol data is thus improved.

Figure 2:
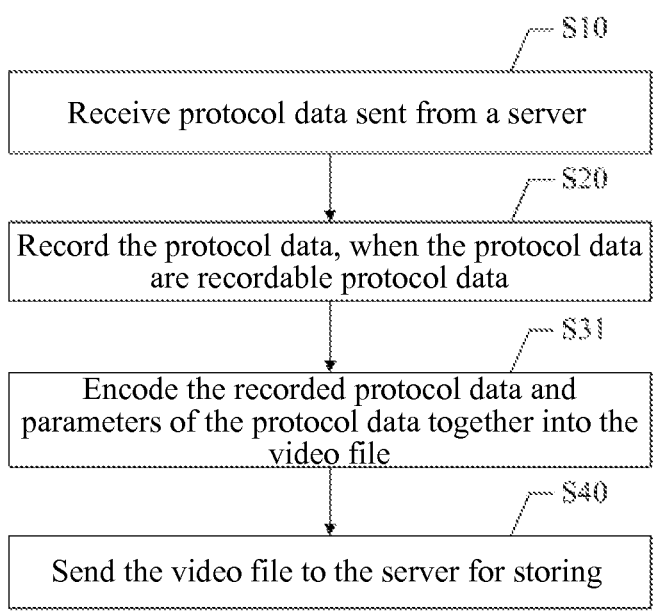
FIG. 2 depicts another exemplary method for recording data of a network interaction protocol consistent with various disclosed embodiments.

FIG. 2 depicts another exemplary method for recording data of a network interaction protocol consistent with various disclosed embodiments. The method of FIG. 2 can be based on the method of FIG. 1 with additional exemplary steps.

In Step S31, the recorded protocol data and parameters of the protocol data are encoded together into the video file. The parameters of the protocol data include a version of a client, a user ID, a username, a recording time, or a combination thereof. The parameter(s) can be encoded using a protocol format of an action message format (AMF) to obtain video files of binary data which occupies small space. When using http to transmit, high transmitting efficiency can be provided.

Figure 3:
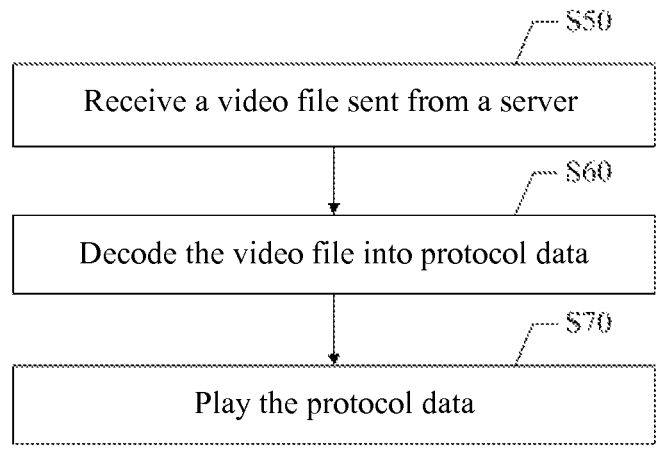
FIG. 3 depicts another exemplary method for recording data of a network interaction protocol consistent with various disclosed embodiments.

FIG. 3 depicts another exemplary method for recording data of a network interaction protocol consistent with various disclosed embodiments. The method of FIG. 3 can be based on the method of FIG. 2 with additional exemplary steps, e.g., following Step S40 of FIG. 2.

In Step S50, the video file sent from the server is received. When playbacks of video files are needed, the playback program calls a video player to obtain video file(s) from the storage medium of the game server, or from the storage server of game videos. The video player can include a webpage version or a client version.

In Step S60, the video file is decoded into protocol data. The playback program decodes the video file according to the protocol used for encoding to obtain corresponding protocol data. By reading the program version from the video file, the playback program loads corresponding module of fighting logic of the game main program having a corresponding version to the program version, and sends the decoded protocol data to the corresponding module of fighting logic.

In Step S70, the protocol data are played. When calling the video player to play the protocol data, the user can still operate the game element(s) and search for the numerical value of the game in detail (for example, search for the equipment value or status value of a certain character, fighting results, or game results) during the playing process of the protocol data. As the playing process uses loading of corresponding fighting logic module to realize the playback of the protocol data, the playing definition cannot be affected, which helps obtain pictures with high definition.

Figure 4:
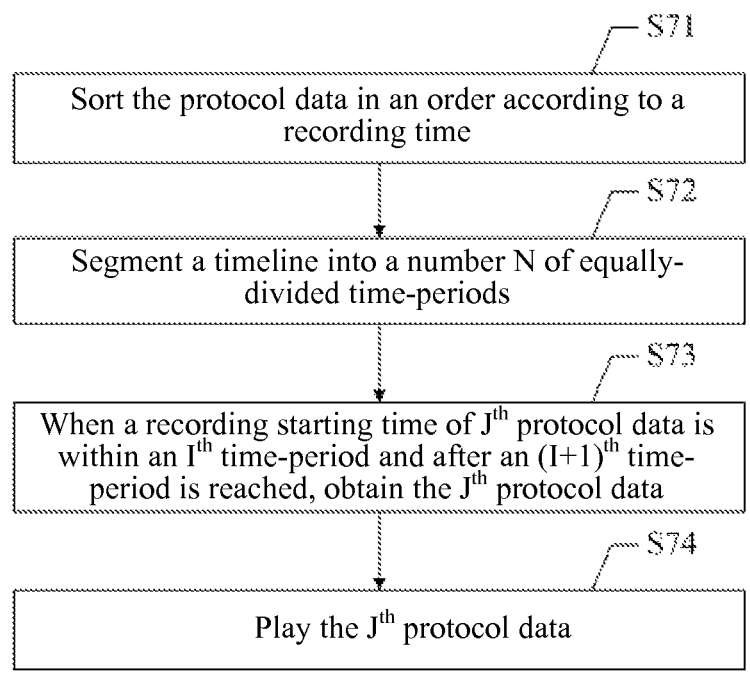
FIG. 4 depicts another exemplary method for recording data of a network interaction protocol consistent with various disclosed embodiments.

FIG. 4 depicts another exemplary method for recording data of a network interaction protocol consistent with various disclosed embodiments. The method of FIG. 4 can be based on the method of FIG. 3 with additional exemplary steps.

In Step S71, the protocol data are sorted in an order according to a recording time. In Step S72, a timeline is segmented into a number N of equally-divided time-periods and the number N is greater than or equal to a number of the protocol data.

In Step S73, $J^{th}$ protocol data are obtained, when a recording starting time of the $J^{th}$ protocol data is within an $I^{th}$ time-period and after a $(I+1)^{th}$ time-period is reached, where I is a serial number of a time period sequentially aligned on the timeline and J is a serial number of the protocol data that are sequentially sorted. In Step S74, the $J^{th}$ protocol data are played.

Figure 7:
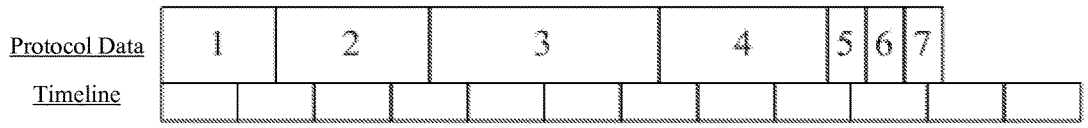
FIG. 7 is a schematic of an exemplary protocol data timeline consistent with various disclosed embodiments.

For example, referring to FIG. 7, the first line of FIG. 7 is a protocol data listing that are sequentially sorted, and the second line is the timeline. In an example having a time period of 100 ms (milliseconds), protocol data reaching a time condition can be attempted to read from the protocol data listing every other 100 ms. In an example when a recording starting time of third protocol data is 350 ms which is within a fourth time period of about 300 ms to about 400 ms, when reaching a starting time (400 ms) of the fifth time period (ending of the fourth time period), the third protocol data can be extracted for playing. For some protocol data with a short playing time, for example, the $5^{th}$-$7^{th}$ protocol data shown in the listing, the protocol data can still be read every other 100 ms. By using such playback mechanism based on the timeline, various protocol data can correspond to each other such that the protocol data can be played in an order, e.g., according to the sorted time. This can avoid direct skipping, which the user may not understand, during the playing.

Figure 5:
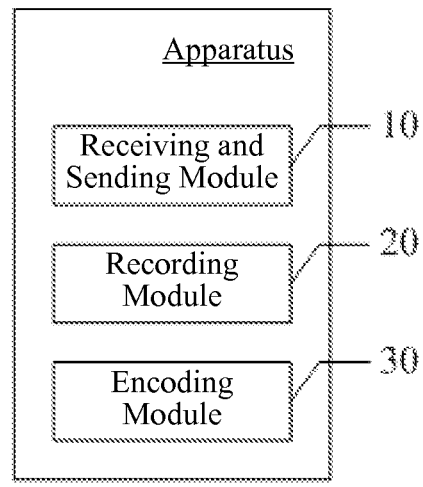
FIG. 5 depicts an exemplary apparatus for recording data of a network interaction protocol consistent with various disclosed embodiments.

FIG. 5 depicts an exemplary apparatus for recording data of a network interaction protocol consistent with various disclosed embodiments. The exemplary apparatus for recording data of the network interaction protocol can be any suitable terminal device such as a personal computer. The exemplary apparatus for recording data of the network interaction protocol includes: a receiving and sending module 10, a recording module 20, and/or an encoding module 30.

The receiving and sending module 10 is configured to receive protocol data sent from a server. The recording module 20 is configured to record the protocol data, when the protocol data are recordable protocol data. The encoding module 30 is configured to encode the recorded protocol data into a video file. The receiving and sending module 10 is further configured to send the video file to the server for storing.

In various embodiments, the network interaction can include, e.g., online games, forums, and/or dating websites. In an example of online games, when a user accesses an online game via a browser, the network layer of main program of the game may receive protocol data sent from a game server. The protocol data includes recordable protocol and the non-recordable protocol. The recordable protocol includes a protocol marked as recordable when being developed. The recordable protocol can include, e.g., a fighting protocol. The non-recordable protocol includes recordable protocols that are not marked as recordable, when being developed. The non-recordable protocol can include, e.g., an interaction protocol.

When receiving the protocol data, the main program of the game (or game main program) determines whether the protocol data are marked as recordable protocol. When sending the protocol data to the fighting logic of the game main program, the main program further simultaneously records the recordable protocol data. For the recorded protocol data code, as the data volume (or size) of the protocol data is small, the data volume of the video file obtained after encoding is also small. The occupied network transmitting source and the storage space can thus be less, which improves transmitting efficiency for uploading, sharing, etc. Additionally, the encoding process does not cause any burden to the process of the game itself. The video file is uploaded to the storage medium of the game server, or uploaded to the storage server for the game videos, the video files can be directly downloaded from the game server or the storage server when playbacks are needed.

As such, the video files are obtained from encoding protocol data. As the data volume of the protocol data is small, the data volume of the video files after encoding is also small. The occupied network transmitting source and the storage space can thus be less, which improves transmitting efficiency for uploading, sharing, etc. Additionally, the encoding process does not cause any burden to the process of the game itself. Further, due to the pre-marking of the recordable protocol data, when the user accesses the game, the main program can record the recordable protocol data automatically without manually starting the recording function by the user. Reliability for recording the protocol data is thus improved.

In addition, the recording module 20 is further configured to encode the recorded protocol data and parameters of the protocol data together into the video file. The parameters of the protocol data include a version of a client, a user ID, a username, a recording time, or a combination thereof. The parameter(s) can be encoded using a protocol format of an action message format (AMF) to obtain video files of binary data which occupies small space. When using http to transmit, high transmitting efficiency can be provided.

Figure 6:
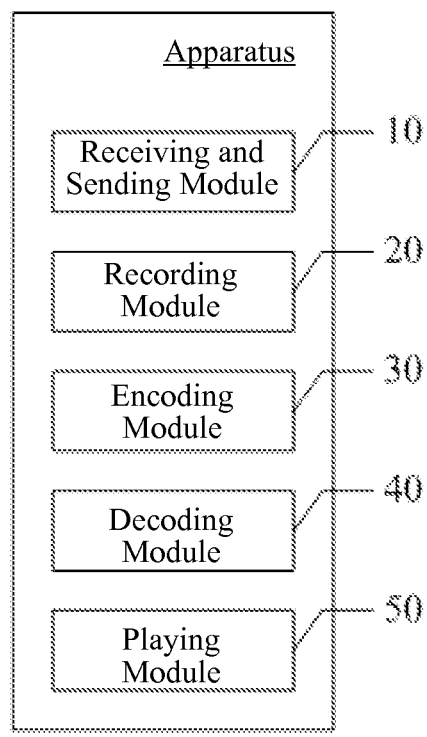
FIG. 6 depicts another exemplary apparatus for recording data of a network interaction protocol consistent with various disclosed embodiments.

FIG. 6 depicts another exemplary apparatus for recording data of a network interaction protocol consistent with various disclosed embodiments. The apparatus of FIG. 6 can be based on the apparatus of FIG. 5 with additional modules, e.g., a decoding module 40, and/or a playing module 50.

In this case, the receiving and sending module 10 is further configured to receive the video file sent from the server. The decoding module 40 is configured to decode the video file into the protocol data. The playing module 50 is configured to play the protocol data.

When playbacks of video files are needed, the playback program calls the video player to obtain video file(s) from the storage medium of the game server, or from the storage server of game videos. The video player can include a webpage version or a client version. The playback program decodes the video file according to the protocol used for encoding to obtain corresponding protocol data.

Figure 8:
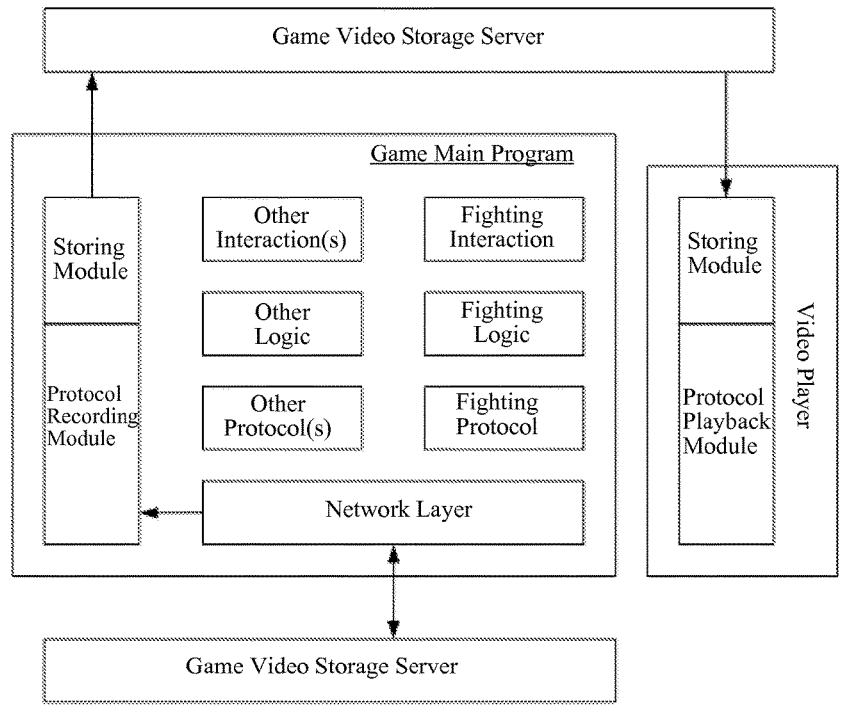
FIG. 8 depicts an exemplary network interaction consistent with various disclosed embodiments.

By reading the program version from the video file, the playback program loads corresponding module of fighting logic of the game main program having a corresponding version to the program version, and sends the decoded protocol data to the corresponding module of fighting logic (as shown in FIG. 8). When calling the video player to play the protocol data, the user can still operate the game element(s) and search for the numerical value of the game in detail (for example, search for the equipment value or status value of a certain character, fighting results, or game results) during the playing process of the protocol data. As the playing process uses loading of corresponding fighting logic module to realize the playback of the protocol data, the playing definition cannot be affected, which helps obtain pictures with high definition.

In addition, the playing module 50 is further configured to sort the protocol data in an order according to a recording time and to segment a timeline into a number N of equally-divided time-periods, where the number N is greater than or equal to a number of the protocol data. The playing module 50 is further configured to obtain $J^{th}$ protocol data, when a recording starting time of the $J^{th}$ protocol data is within an $I^{th}$ time-period and after arriving a $(I+1)^{th}$ time-period, where I is a serial number of the time period sequentially aligned on the timeline, and J is a serial number of the protocol data that are sequentially sorted. The playing module 50 is further configured to play the $J^{th}$ protocol data.

For example, referring to FIG. 7, the first line of FIG. 7 is a protocol data listing that are sequentially sorted, and the second line is the timeline. In an example having a time period of 100 ms (milliseconds), protocol data reaching a time condition can be attempted to read from the protocol data listing every other 100 ms. In an example when a recording starting time of third protocol data is 350 ms which is within a fourth time period of about 300 ms to about 400 ms, when reaching a starting time (400 ms) of the fifth time period (ending of the fourth time period), the third protocol data can be extracted for playing. For some protocol data with a short playing time, for example, the $5^{th}$-$7^{th}$ protocol data shown in the listing, the protocol data can still be read every other 100 ms.

By using such playback mechanism based on the timeline, various protocol data can correspond to each other such that the protocol data can be played in an order, e.g., according to the sorted time. This can avoid direct skipping, which the user may not understand, during the playing.

FIG. 8 depicts exemplary system for recording data of a network interaction protocol consistent with various disclosed embodiments. In an exemplary network interaction of online games, when a user accesses the online game via a browser (e.g., installed on a terminal device), the network layer of main program of the game may receive protocol data sent from a game server, e.g., a game video storage server. It is also determined whether the protocol data are marked as recordable protocol.

In one embodiment, a fighting protocol can be marked as a recordable protocol, while the other protocols may not be marked. The network layer sends all of protocol data to the fighting logic, and sends the fighting protocol data (i.e., the recordable protocol) to the protocol recording module for recording. The protocol recording module records the fighting protocol data, and encodes the fighting protocol data together with the client version (also referred to as game program version), the user ID (UIN), the user name (i.e., player name), and/or the recording time to generate a video file having an AMF format, then stores in the storing module of the game main program implemented by the terminal device for the storing module to upload to the game video storage server. A video player can then download the video file from the game video storage server and store the video file in the video player for playbacks (e.g., for sharing with other users on different terminal devices).

As the data volume of the protocol data is small, the data volume of the video files after encoding is also small. The occupied network transmitting source and the storage space can thus be less, which improves transmitting efficiency for uploading, sharing, etc. Additionally, the encoding process does not cause any burden to the process of the game itself. Further, due to the pre-marking of the recordable protocol data, when the user accesses the game, the main program can record the recordable protocol data automatically without manually starting the recording function by the user. Reliability for recording the protocol data is thus improved.

When playing back, the video player is called to obtain the video file from the game video storage server to be stored in the storing module. The protocol playback module of the video player decodes the video file to obtain the protocol data. According to the game program version of the video file, the fighting logic of game main program having a corresponding version is loaded. The protocol data are transmitted to the fighting logic for playing the protocol data.

As the playing process uses loading of corresponding fighting logic module to realize the playback of the protocol data, the playing definition cannot be affected, which helps obtain pictures with high definition. In addition, when calling the video player to play the protocol data, the user can still operate the game element(s) and search for the numerical value of the game in detail (for example, search for the equipment value or status value of a certain character, fighting results, or game results) during the playing process of the protocol data. The degree of interactive participation is improved.

It should be noted that, in the present disclosure each embodiment is progressively described, i.e., each embodiment is described and focused on difference between embodiments. Similar and/or the same portions between various embodiments can be referred to with each other. In addition, exemplary apparatus are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art can understand that the modules included herein are described according to their functional logic, but are not limited to the above descriptions as long as the modules can implement corresponding functions. Further, the specific name of each functional module is used for distinguishing from one another without limiting the protection scope of the present disclosure.

As used herein, the term "module" can be software objects executed on a computing system. A variety of components described herein including elements, modules, units, engines, and services can be executed in the computing system. The methods, apparatus, and/or systems can be implemented in a software manner. Of course, the methods, apparatus, and/or systems can be implemented using hardware. All of which are within the scope of the present disclosure.

In various embodiments, the disclosed modules can be configured in one apparatus (e.g., a processing unit) or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In the disclosed methods, apparatus, and systems for recording data of a network interaction protocol, protocol data sent from a server are received and recorded, when the protocol data are recordable protocol data. The recorded protocol data are encoded into a video file, which is then sent to the server for storing. The apparatus and systems for recording data of a network interaction protocol can be implemented for online games. As the data volume of the protocol data is small, the data volume of the video files after encoding is also small. The occupied network transmitting source and the storage space can thus be less, which improves transmitting efficiency for uploading, sharing, etc. Additionally, the encoding process does not cause any burden to the process of the game itself. Further, due to the pre-marking of the recordable protocol data, when the user accesses the game, the main program can record the recordable protocol data automatically without manually starting the recording function by the user. Reliability for recording the protocol data is thus improved.

When playing back, a video player is called to obtain the video file from the game video storage server to be stored in the storing module. The protocol playback module of the video player decodes the video file to obtain the protocol data. According to the game program version of the video file, the fighting logic of game main program having a corresponding version is loaded. The protocol data are transmitted to the fighting logic for playing the protocol data. As the playing process uses loading of corresponding fighting logic module to realize the playback of the protocol data, the playing definition cannot be affected, which helps obtain pictures with high definition. In addition, when calling the video player to play the protocol data, the user can still operate the game element(s) and search for the numerical value of the game in detail (for example, search for the equipment value or status value of a certain character, fighting results, or game results) during the playing process of the protocol data. The degree of interactive participation is improved.

It should be noted that, in the present disclosure each embodiment is progressively described, i.e., each embodiment is described and focused on difference between embodiments. Similar and/or the same portions between various embodiments can be referred to with each other. In addition, exemplary apparatus are described with respect to corresponding methods.

What is claimed is:

1. A method for recording data of a network interaction protocol, comprising:
   receiving, by a client, protocol data sent from a server;
   recording, by the client, the protocol data, when the protocol data are recordable protocol data;
   encoding, by the client, the recorded protocol data and parameters of the protocol data together into a video file, the parameters of the protocol data comprising a version of the client, a user ID, a username and a recording time;

sending, by the client, the video file to the server for storing;

receiving, by the client, the video file stored in the server;

decoding, by the client, the video file into the protocol data; and playing, by the client, the protocol data after decoding;

wherein when the protocol data is a fighting game protocol of a fighting game, the step of recording, by the client, the protocol data, comprises:

sending the protocol data to a fighting logic of a game main program; and simultaneously recording the recordable protocol data in the game main program.

2. The method according to claim 1, wherein the step of playing the protocol data includes:

sorting the protocol data in an order according to a recording time;

segmenting a timeline into a number N of equally-divided time-periods, wherein the number N is greater than or equal to a number of the protocol data;

when a recording starting time of $J^{th}$ protocol data is within an $I^{th}$ time-period and after an $(I+1)^{th}$ time-period is reached, obtaining the $J^{th}$ protocol data, wherein I is a serial number of a time period sequentially aligned along the timeline, and J is a serial number of the protocol data that are sequentially sorted; and playing the $J^{th}$ protocol data.

3. The method according to claim 1, wherein the encoding uses a format including a protocol format of an action message format (AMF).

4. The method according to claim 1, wherein the step of decoding, by the client, the video file into the protocol data, comprises:

reading the version of the client from the video file;

loading a corresponding module of the fighting logic of the game main program having a corresponding version to the client; and sending the decoded protocol data to the corresponding module of the fighting logic of the game main program.

5. The method according to claim 1, wherein when the client playing the protocol data after decoding, a user can operate a game element of the fighting game and search a numerical value of the fighting game.

6. A client device for recording data of a network interaction protocol, comprising:

a memory;

a processor coupled to the memory;

a plurality of program modules stored in the memory to be executed by the processor, the plurality of program modules comprising:

a receiving and sending module, configured to receive, by the client device, protocol data sent from a server;

a recording module, configured to record, by the client device, the protocol data, when the protocol data are recordable protocol data;

an encoding module, configured to encode, by the client device, the recorded protocol data and parameters of the protocol data together into a video file, the parameters of the protocol data comprising a version of the client device, a user ID, a username and a recording time, wherein the receiving and sending module is further configured to send the video file to the server for storing;

a decoding module, configured to decode, by the client device, the video file into the protocol data when the receiving and sending module receives the video file stored in the server; and a playing module, configured to play, by the client device, the protocol data after decoding;

wherein when the protocol data is a fighting game protocol of a fighting game, the step of recording, by the client, the protocol data, comprises:

sending the protocol data to a fighting logic of a game main program; and simultaneously recording the recordable protocol data in the game main program.

7. The apparatus according to claim 6, wherein the playing module is further configured:

to sort the protocol data in an order according to a recording time;

to segment a timeline into a number N of equally-divided time-periods, wherein the number N is greater than or equal to a number of the protocol data;

to obtain $J^{th}$ protocol data, when a recording starting time of the $J^{th}$ protocol data is within an $I^{th}$ time-period and after an $(I+1)^{th}$ time-period is reached, wherein I is a serial number of a time period sequentially aligned along the timeline, and J is a serial number of the protocol data that are sequentially sorted; and to play the $J^{th}$ protocol data.

8. The apparatus according to claim 6, wherein the encoding module encodes in a format including a protocol format of an action message format (AMF).

9. The apparatus according to claim 6, wherein the decoding module is further configured to:

read the version of the client from the video file;

load a corresponding module of the fighting logic of the game main program having a corresponding version to the client; and send the decoded protocol data to the corresponding module of the fighting logic of the game main program.

10. The apparatus according to claim 6, wherein when the client playing the protocol data after decoding, a user can operate a game element of the fighting game and search a numerical value of the fighting game.

11. A method for recording data of a network interaction protocol, comprising:

receiving, by a client, protocol data sent from a game video storage server;

determining, by the client, that the protocol data are marked as recordable protocol data, wherein the recordable protocol data include fighting protocol data;

sending, by the client, the fighting protocol data to a protocol recording module for recording;

after recording, encoding, by the client, the fighting protocol data together with a parameter of the fighting protocol data to generate a video file having an AMF format, the parameters of the fighting protocol data comprising a game program version, a user ID, a username and a recording time;

sending and storing the video file to a storing module for the storing module to upload to the game video storage server;

receiving, by the client, the video file stored in the game video storage server;

decoding, by the client, the video file into the fighting protocol data; and playing, by the client, the fighting protocol data after decoding;

wherein when the protocol data is a fighting game protocol of a fighting game, the step of recording, by the client, the protocol data, comprises:

sending the protocol data to a fighting logic of a game main program; and simultaneously recording the recordable protocol data in the game main program.

12. The method according to claim 11, wherein the step of playing the fighting protocol data includes:

sorting the fighting protocol data in an order according to a recording time;

segmenting a timeline into a number N of equally-divided time-periods, wherein the number N is greater than or equal to a number of the fighting protocol data;

when a recording starting time of $J^{th}$ fighting protocol data is within an $I^{th}$ time-period and after an $(I+1)^{th}$ time-period is reached, obtaining the $J^{th}$ fighting protocol data, wherein I is a serial number of a time period sequentially aligned along the timeline, and J is a serial number of the fighting protocol data that are sequentially sorted; and playing the $J^{th}$ fighting protocol data.

13. The method according to claim 11, wherein the step of decoding, by the client, the video file into the protocol data, comprises:

reading the version of the client from the video file;

loading a corresponding module of the fighting logic of the game main program having a corresponding version to the client; and sending the decoded protocol data to the corresponding module of the fighting logic of the game main program.

14. The method according to claim 11, wherein when the client playing the protocol data after decoding, a user can operate a game element of the fighting game and search a numerical value of the fighting game.

* * * * *